May 14, 1946.   H. A. STRICKLAND, JR   2,400,473
PORTABLE WELDING GUN
Filed Dec. 16, 1943   3 Sheets-Sheet 1

INVENTOR
Harold A. Strickland, Jr.
BY John P. Tarbor
ATTORNEY

May 14, 1946.  H. A. STRICKLAND, JR  2,400,473
PORTABLE WELDING GUN
Filed Dec. 16, 1943  3 Sheets-Sheet 2
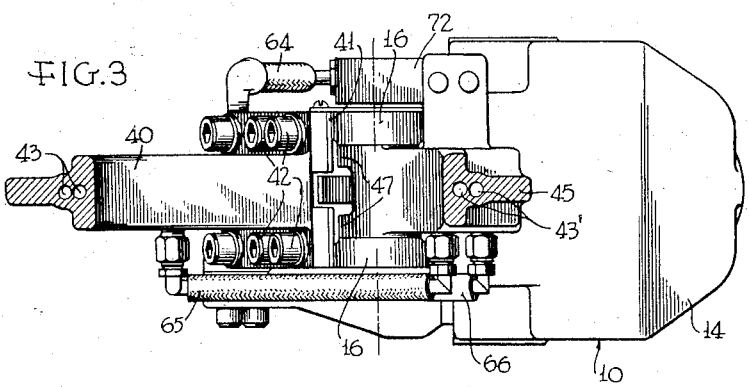
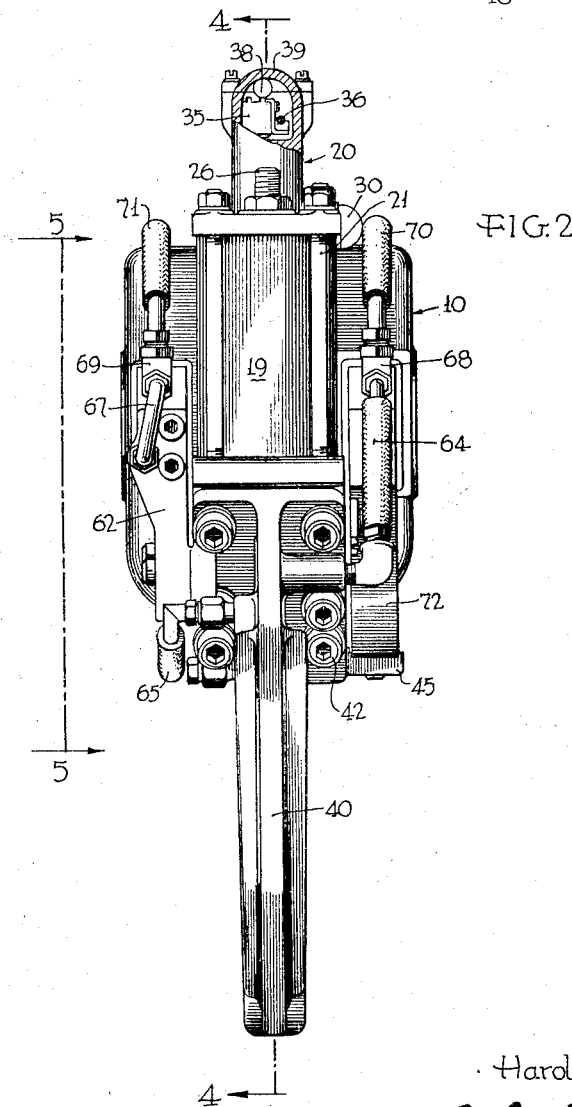
INVENTOR
Harold A. Strickland, Jr.
BY John P. Tarbox
ATTORNEY Patented May 14, 1946

2,400,473

UNITED STATES PATENT OFFICE 2,400,473

PORTABLE WELDING GUN

Harold A. Strickland, Jr., Detroit, Mich., assignor to Budd Wheel Company, Philadelphia, Pa., a corporation of Pennsylvania Application December 16, 1943, Serial No. 514,469

6 Claims. (Cl. 219—4)

The invention relates to a portable welding gun and more particularly to a welding gun of the so-called pincer type having one swingable electrode arm.

Still more specifically, the invention refers to improvements in such a welding gun as disclosed in the inventor's application, Serial No. 412,235, filed September 25, 1941, on Welding tool, now Patent No. 2,349,835, issued May 30, 1944.

Among the objects of the invention are a welding gun of still lower weight, smaller size, greater simplicity and lower cost than other guns adapted to do similar work and particularly than the gun disclosed in the inventor's aforesaid application.

The aforesaid objects are of great importance at the present time. Lower weight and smaller size permit the employment of weaker persons, such as women or youths, who had to be excluded from certain work because the handling of the heavier and larger welding guns went beyond their strength and endurance. In other words, a lighter welding gun taps a new reserve of man power for specifically important types of work.

Simplicity is likewise important for similar reasons at times when unskilled labor in steadily growing amount has to be drawn into the production process.

The lower weight and smaller size entail also saving of critical materials of which welding guns consist necessarily to a large extent.

The lower costs which are partly a consequence of the hereinbefore outlined conditions of weight, size and simplicity are, of course, also highly desirable.

The objects of the invention are in large part achieved by a new arrangement and formation of the parts constituting the gun and particularly of the mechanism for moving the electrodes.

The features of the invention will be more easily and fully understood from the embodiment illustrated in the attached drawings and described in the following.

In the drawings,

Figure 2 is an end elevation seen in the direction of the arrows on line 2—2 of Figure 1, partly in section along said line.

Figure 3 is an under side view partly in a section along line 3—3 of Figure 1.

Figure 1:
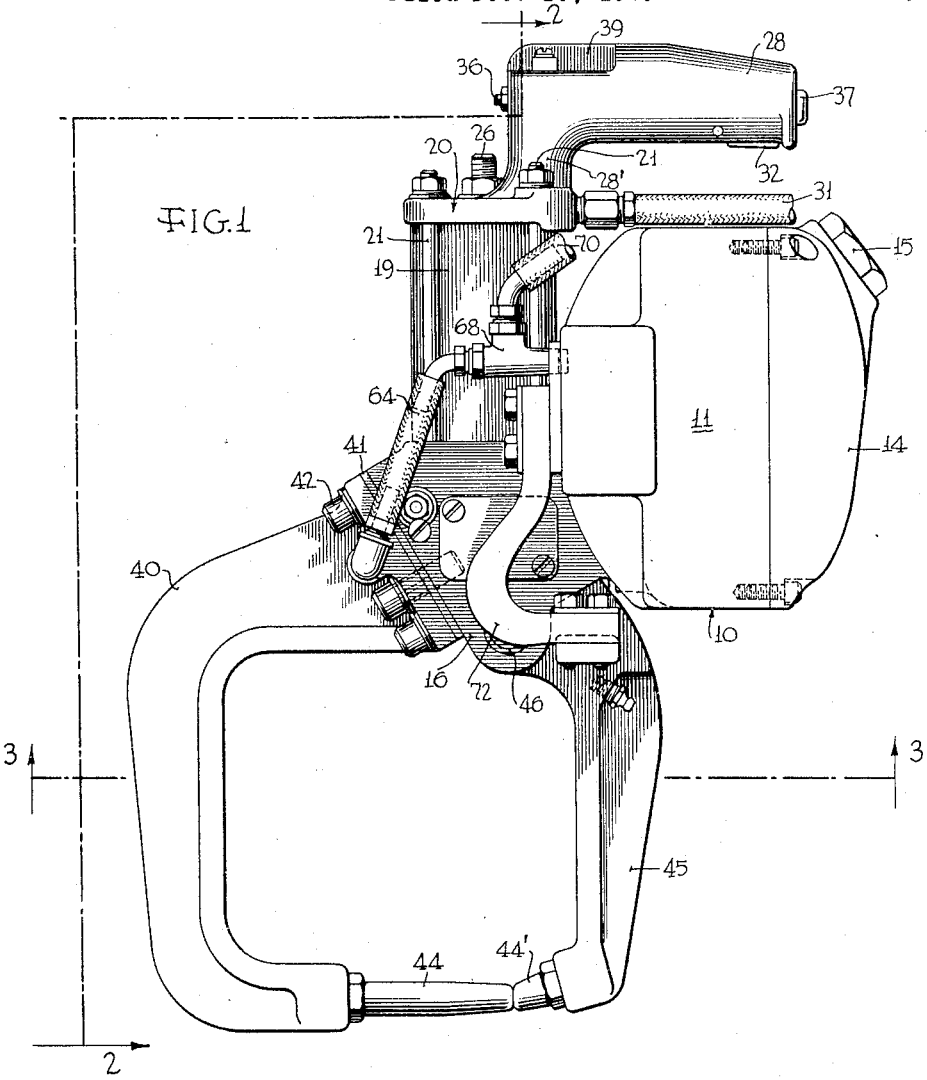
Figure 1 is a side elevation of a welding gun according to the invention.
Figure 5:
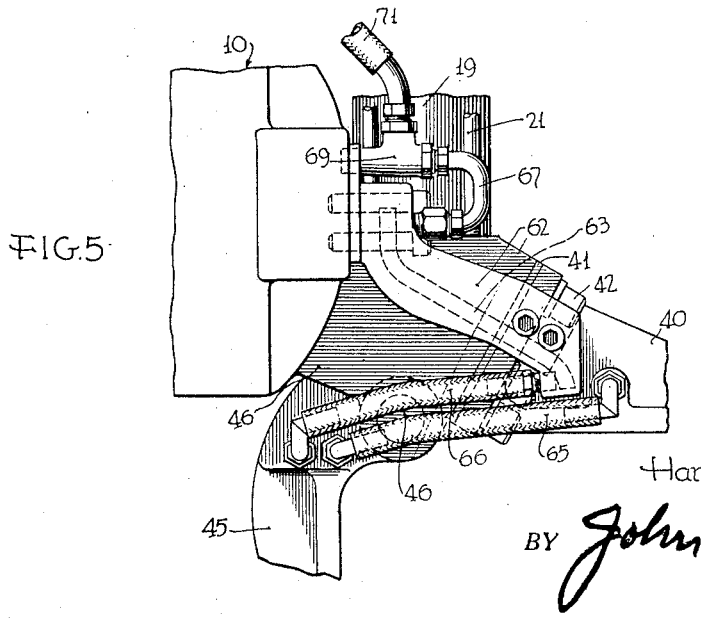
Figure 5 is a fragmentary view seen in the direction of the arrows on line 5—5 of Figure 2 and showing the side of the gun opposite to the side shown in Figure 1.
Figure 4:
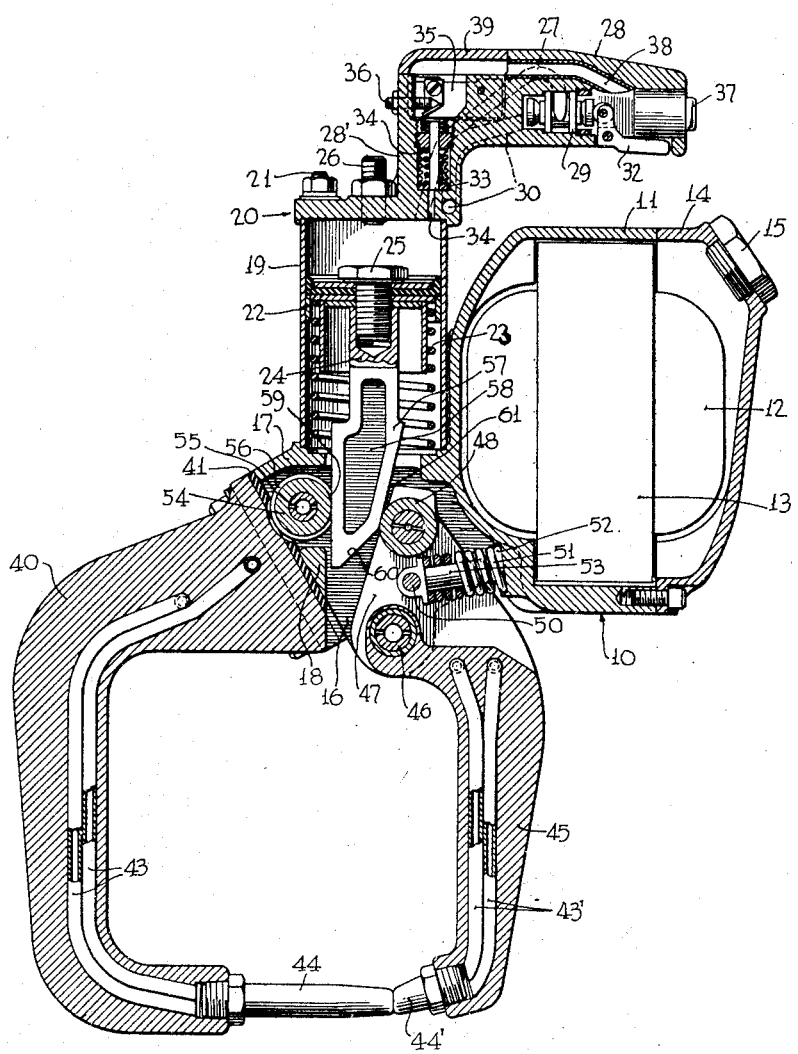
Figure 4 is a section along line 4—4 of Figure 2.

The casting 10, preferably of light metal such as aluminum, forms a major portion of a casing 11 for the diagrammatically shown welding transformer 12 which is held by its core 13 between the casing 11 and the cover 14. 15 is a plug for the attachment of the wires (not shown) leading to the transformer primary.

The casting 10 presents furthermore two walls 16 interconnected by a wall 17. The walls 16 and 17 form together and with a portion of the casing 11 an open recess. 18 is a cross connection between the walls 16 and also forms part of the casting 10.

The wall 17 carries on its outside a cylinder 19 which is closed by a second casting or top 20. The cylinder 19 and the top 20 are held together and secured to the wall 17 by anchor bolts 21. A piston 22 is movable in the cylinder. A spring 23 inserted between piston and the wall 17 forces the piston toward the outer end of the cylinder. A piston rod 24 is secured to the piston 22 by means of the screw bolt 25. The head of the bolt 25 cooperates with a screw 26 threaded into the top 20 and serves for the adjustment of the stroke of the piston.

The interior of the cylinder 19 above the piston 22 communicates by a conduit 27 provided in the casting 20 and its handle portion 28 with a three way valve 29 which is likewise housed in this handle. The valve 29 communicates, furthermore, by means of a conduit 30 in casting 20 and the hose 31 with a source of compressed air or the like. 32 is a trigger upon the operation of which the valve 29 makes connection between the conduit 30 and the conduit 27 so that compressed air is admitted to the interior of the cylinder and forces the piston 22 downwardly against the resistance of spring 23. Upon release of the trigger 32, the valve 29 closes the connection between the conduits 30 and 27 and makes connection between the conduit 27 and the outside atmosphere thereby releasing the compressed air in the cylinder and permitting the piston 22 to return under the action of the spring 23.

In the hollow stem 28' of the handle 28 is housed a small piston 33 which is exposed through the conduit 34 to the pressure in the cylinder 19. If the pressure in the cylinder reaches a certain amount, the piston 33 is moved upwardly against the action of the spring 34 and actuates a switch 35. Switch 35, the details of which need not be described, serves for controlling the welding current. The wire connections leading to the switch are not shown. 36 is a screw for adjusting the switch and 37 is a push button which may be used in case of solenoid control. 38 is a passage for the wires (not shown) and 39 is a cover plate which gives access to the switch 35, the piston 33 and associated parts.

The outer margin of the wall 17, the adjoining outer margins of the wall 16 and the cross member 18 of the casting 10 present together a plane surface which is inclined to the axis of cylinder 19. Against this surface rests the stationary electrode arm or support 40 with a correspondingly shaped surface by the intermediary of a layer 41 of insulating material. 42 are screws holding the arm 40 against the casting 10; insulating material is also placed between the screws and the arm 40. The arm 40 is generally T shaped in cross section and provided at about the center of the T with two conduits 43 for a cooling medium for the electrode 44.

A second electrode arm or holder 45 of similar cross section carries an electrode 44' opposite the electrode 40 and is provided with conduits 43' for the cooling medium. The arm 45 is journaled to the casting 10 and has its driving mechanism arranged substantially in the space formed between part of the transformer casing 11, the attachment surface of the arm 40 and the walls 16 and 17. The arm 45 is journaled to the walls 16 of the casing 10 by the pin 46. The inner end of the arm 45 is bifurcated at 47 and carries between its two prongs a roller 48 rotatable about a pin 49. The roller 48 is arranged close to the wall 17. A second pin 50 interconnects the two prongs 47 in the space between the roller 48 and the pin 46. A support 51 for a compression spring 52 is journaled to the pin 50. The other end of the spring 52 is held in a recess 53 of the casting 10.

A second roller 54 is supported rotatably about a pin 55 substantially opposite the roller 48. The pin 55 is supported by the walls 16 and is located in the corner between the walls 16, 17, the cross member 18 and end of arm 40. The roller 54 is provided with marginal flanges 56 which serve as a guide for one side of a wedge 57 which forms an integral part of the piston rod 24 and is, for the sake of lightness, hollowed out at 58. The straight side 59 of the wedge engages the roller 54. The other side of the wedge has a sharply inclined portion 60 and a less inclined portion 61. The inclined portions 60 and 61 engage successively the roller 48.

When the piston 22 is forced outwardly by admission of the pressure medium, the wedge 57 forces the roller 48 and the connected portion 47 of the arm 45 away from the stationary roller 54 so that the arm 45 swings about its pivot 46 and its electrode 44' is forced against the electrode 44 of the other arm 40. Upon the release of the pressure from the cylinder, the piston 22 is moved outwardly by the spring 23 and the arm 45 swung back by the spring 52.

The arm 40 is connected to one end of the transformer secondary by the rigid conductor 62 which is provided with a conduit 63 for the cooling fluid. The conduits 43 and 43' in the electrode arms and the conduit 63 are connected in series by flexible hoses 64, 65, 66, a short pipe 67 and three-way nipples 68, 69, to flexible hoses 70, 71 which lead to a source of a cooling medium. The nipples 68, 69 also make connection with the tubular secondary conductors of the transformer (not shown). The electrode arm 45 is connected to the other end of the transformer secondary by the flexible conductor 72.

By comparing the welding gun disclosed in the attached drawings with the welding gun disclosed in the earlier application hereinbefore referred to, it will be found that a substantial reduction of size and weight is obviously achieved by the following means:

1. The pivot for the movable electrode arm is moved closer to the cylinder into the space at the side of the transformer casing.

2. The spring for moving the one electrode back is arranged between the pivot for the electrode arm and the roller engaging the wedge thereby allowing the arrangement of the spring likewise at the side of the transformer casing.

3. Due to the described arrangement of the pivot and the spring for the movable electrode arm, the piston rod is substantially shorter.

4. The handle for carrying the gun forms part of the cylinder cover so that the transformer casing is entirely relieved from severe stresses. This arrangement permits also a simple arrangement of the conduits between valve and piston in the interior of the handle.

5. The electrical connections and the connections for the cooling medium leading to and from the transformer secondary are arranged at the sides of the cylinder thereby further reducing the size of the transformer casing.

The importance of these features are explained in the first part of the specification.

The invention is not restricted to the details of the illustrated and described embodiment. Such changes as will occur to those skilled in the art are intended to be covered by the attached claims.

What is claimed is:

1. Portable welding gun having a transformer and a motor device arranged side by side and electrodes with tips arranged generally in line with the axis of the motor device, conductors connecting said transformer and said electrodes, said conductors being secured to the transformer at the side adjacent the motor device, one conductor on each side of said device relative to a plane defined by the middle lines of the transformer and the device.

2. Portable welding gun according to claim 1 including additionally a pair of connecting means for conduits for a cooling medium, one of said means being adjacent each of the points of attachment of said conductors to the transformer.

3. A portable pincer-type welding gun comprising a transformer and a cylinder arranged side by side, a pair of electrode holders, said cylinder including a reciprocable piston therein and having a length shorter than said transformer, the end of the cylinder and part of one side of the transformer forming a recessed corner, a supporting structure arranged in said corner, means securing said holders to said structure including a pivot element on the structure for swingably supporting one of said holders near the end of the transformer, and means arranged in said corner adapted to transmit the motion from the piston to the swingable holder.

4. Portable welding gun according to claim 3, including additionally a spring device engaging the swingable holder in the space between said axis and said pivot element for returning said swingable holder after movement thereof by said piston.

5. In a portable welding gun, a structure comprising a transformer casing, a motor, a pair of electrode holders, common casing attached support means for said motor and electrode holders to support the same on one side of and adjacent said casing, said motor including a piston having a power terminal, and one of said electrode holders having a pivot attachment to said support and an actuator for engaging said power terminal, and a spring device for returning said pivoted electrode holder to open position after release from closure, said spring device being positioned intermediate the electrode holder pivot and actuator.

6. In a portable welding gun, a structure comprising a transformer casing, a motor including a power element, a pair of electrode holders, support means for supporting said motor and holders on one side of and adjacent said casing, one of said electrode holders having a pivot attachment to said support and an actuator for engaging said power element, and a spring device positioned between the electrode holder actuator and pivot point for returning said pivot electrode holder to open position after release from closure by said power element.

HAROLD A. STRICKLAND, Jr.